United States Patent [19]
Waddill et al.

[11] 4,185,149
[45] Jan. 22, 1980

[54] NOVEL EPOXY CURING SYSTEM

[75] Inventors: Harold G. Waddill; Philip H. Moss, both of Austin, Tex.

[73] Assignee: Texaco Development Corporation, White Plains, N.Y.

[21] Appl. No.: 941,820

[22] Filed: Sep. 11, 1978

[51] Int. Cl.² .............................................. C08G 59/50
[52] U.S. Cl. .................................... 528/111; 525/507; 528/118; 528/94; 528/34; 528/407
[58] Field of Search ................ 528/94, 111, 118, 135, 528/407, 408; 260/830 R

[56] References Cited

U.S. PATENT DOCUMENTS

| | | | |
|---|---|---|---|
| 3,575,926 | 4/1971 | Joyce et al. | 260/47 |
| 3,639,928 | 2/1972 | Bentley et al. | 260/47 EC |
| 3,839,281 | 10/1974 | Dreher | 260/47 EN |
| 3,943,104 | 3/1976 | Waddill | 260/47 EN |
| 4,110,313 | 8/1978 | Schulze et al. | 528/90 |

*Primary Examiner*—Earl A. Nielsen
*Attorney, Agent, or Firm*—Carl G. Ries; Robert A. Kulason; Kenneth R. Priem

[57] ABSTRACT

A novel epoxy resin curing agent comprises oligomeric poly(ethylenepiperazine). The resins comprise a vicinal polyepoxide and a curing amount of oligomeric poly(ethylenepiperazine).

6 Claims, No Drawings

NOVEL EPOXY CURING SYSTEM

BACKGROUND OF THE INVENTION

1. Field of the Invention

This invention relates to curable epoxy resins. More particularly, to a novel curing agent, oligomeric poly(ethylenepiperazine).

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents are generally the anhydrides. The most commonly used anhydride curing agents are difunctional materials such as maleic anhydride, phthalic anhydride and the like, as well as tetrafunctional materials such as pyromellitic dianhydride.

Epoxy resin formulations using prior art curing agents usually comprise two components, one containing the epoxy resin and the other containing the curing agent. These must be mixed only when a cured product is desired often by persons unfamiliar with formulating techniques.

A novel epoxy resin curing agent is disclosed herein which can be mixed with the epoxy resin and stored as a one component system. This system can then be cured by the application of heat.

This novel curing agent also accelerates the cure of certain prior art curing agents.

The cured epoxy resin compositions of the instant invention are useful as coatings, castings, and sealants.

SUMMARY OF THE INVENTION

According to the broad aspect of the instant invention, an epoxy resin is cured with oligomeric poly(ethylenepiperazine).

In one aspect, a curable epoxy resin composition comprises a vicinal polyepoxide and a curing amount of oligomeric (polyethylenepiperazine).

In another aspect a curable epoxy resin comprises a vicinal polyepoxide, a curing amount of a prior art curing agent and oligomeric (polyethylenepiperazine).

DETAILED DESCRIPTION OF THE INVENTION

According to one embodiment of the instant inventive concept, blends of a polyepoxide and oligomeric poly(ethylenepiperazine) are thoroughly admixed and cured in accordance with conventional methods to provide cured epoxy resins having excellent properties.

Generally the vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4- hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-,3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., Handbook of Epoxy Resins, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The novel epoxy curing agent of this invention is oligomeric poly(ethylenepiperazine) which as the general formula

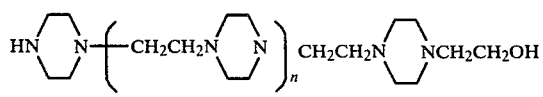

where n can be 1–20 but is preferably 2–6. It is a crystalline, hard, insoluble solid, readily reduced to a finely divided powder, melting at about 230° C. It is prepared by heating 1-(2-hydroxyethyl)piperazine in an inert liquid at an elevated temperature in presence of an acidic catalyst such as an aromatic carboxylic acid.

This novel curing agent may be used alone or in combination with other curing agent(s). Due to the highly insoluble nature of the oligomeric poly(ethylenepiperazine) in most liquids, including epoxy resins, it performs as a latent catalyst, permitting formulation of one component systems. That is, the uncured epoxy resin and the oligomeric poly(ethylenepiperazine) may be mixed and stored until needed. At room temperature, no curing will take place. The mixture may then be applied and heated, whereupon curing will take place. This offers many advantages including more accurate formulating and easier handling over the two component systems of the prior art.

The oligomeric (polyethylenepiperazine) of the invention may also be used in a two component system where another curing agent is used. When used in combination with certain other curing agents, the oligomeric (polyethylene-piperazine) acts as an accelerator.

Derivatives of the poly(ethylenepiperazine) such as those prepared by reacting the oligomeric poly(ethylenepiperazine) with compounds which react with the terminal —OH and/or —NH groups are also useful as curing agents in this invention. For example, carboxylic acids and alkylene oxides, to name only two, can be reacted to form derivatives of oligomeric poly(ethylenepiperazine) which are useful as curing agents in this invention.

The cured resins, in accordance with the instant invention, may be prepared in a conventional manner. The oligomeric poly(ethylenepiperazine) curing agent is admixed with the polyepoxide composition in amounts according to the functional equivalent weight of the curing agent employed. Generally the number of equivalents of reactive groups is from about 0.8 to about 1.2 times the number of epoxide equivalents present in the curable epoxy resin composition, with from 0.9 to a stoichiometric amount being preferred. The exact amount of constituents in accordance with the above general requirements will depend primarily on the application for which the cured resin is intended.

The novel curing agent is incorporated into the resin by admixing. The constituents forming the curable material are intimately admixed by standard methods and degassed in the presence of a commercial defoamer and minute amounts of silicone oils to prevent voids and bubbles.

In accordance with a preferred embodiment, a curable resin comprises a diglycidyl ether of 4,4'-isopropylidene bisphenol and an effective amount of the oligomeric poly(ethylenepiperazine) curing agent. According to a greatly preferred embodiment, from about 10 to about 30 parts by weight of curing agent is used per 100 parts of resin. Generally, the mixture of epoxy resin and the oligomeric poly(ethylenepiperazine) is allowed to self-cure at elevated temperatures up to about 200° C.

It will further be realized that various conveniently employed additives can be admixed with the polyepoxide containing composition of the instant invention prior to final cure. For example, conventional pigments, dyes, fillers, flame retarding agents and the like which are compatible, natural or synthetic resins can be added.

Furthermore, known solvents for polyepoxide materials such as toluene, benzene, xylene, dioxane, ethylene glycol monomethylether and the like can be used. The polyepoxide resins of the instant invention can be used in any of the above applications for which polyepoxides are customarily used.

The compositions of the instant invention can be used as impregnants, surface coatings, pottings, capsulating compositions and laminates.

The following examples illustrate the nature of the instant invention but are not intended to be limitative thereof.

EXPERIMENTAL

Curing with Oligomeric Poly(Ethylenepiperazine)=E/P Polymer

This example demonstrates that satisfactorily cured epoxy resins are obtained using oligomeric poly(ethylenepiperazine) as the sole curing agent.

|  | A | B | C |
|---|---|---|---|
| Formulation: | | | |
| Epoxy resin (EEW 185) | 100 | 100 | 100 |
| E/P Polymer | 15 | 20 | 25 |
| Properties of cured ⅛" | | | |
| Casting: | | | |
| Izod impact strength, ft.-lbs./in. | 0.26 | 0.27 | 0.13 |
| Tensile strength, psi. | 7400 | 6000 | 5300 |
| Tensile modulus, psi. | 424000 | 434000 | 406000 |
| Elongation at break, % | 1.9 | 1.4 | 1.3 |
| Flexural strength, psi. | 13800 | 12500 | 11200 |
| HDT, °C, 264 psi/66 psi. | 74/83 | 78/86 | 74.5/83 |
| Shore D hardness, 0–10 sec. | 88–86 | 89–87 | 89–87 |

[1]Cured 1 hr. 80°, 1 hr. 120°, 3 hrs 160° C. Smaller amounts of E/P Polymer when used as a curative resulted in incomplete curing.

We claim:
1. An epoxy resin composition which comprises:
 a vicinal polyepoxide having an average of at least 1.8 reactive, 1,2-epoxy groups per molecule and
 an amount of oligomeric poly(ethylenepiperazine) effective for curing the epoxy resin.
2. An epoxy resin composition as in claim 1 wherein the oligomeric poly(ethylenepiperazine) is present in an amount comprising at least 10 parts by weight per 100 parts by weight of epoxy resin.
3. A method for curing an epoxy resin composition wherein the epoxy resin comprises a vicinal polyepox- ide having an epoxide equivalency of greater than 1.8 comprising the steps of:

adding to said vicinal polyepoxide an effective amount of oligomeric poly(ethylenepiperazine) and heating the resulting mixture to effect a cure.

4. A method as in claim 3 wherein the oligomeric poly(ethylenepiperazine) is present in an amount comprising at least 10 parts by weight per 100 parts by weight of epoxy resin.

5. A curable resin composition comprising a diglycidyl ether of 4,4'-isopropylidene bisphenol polyepoxide and a curing amount of oligomeric (polyethylenepiperazine).

6. A curable resin composition as in claim 7 wherein the oligomeric poly(ethylenepiperazine) is present in an amount comprising at least 10 parts by weight per 100 parts by weight of polyepoxide.